United States Patent
Herrmann et al.

(10) Patent No.: US 11,326,267 B2
(45) Date of Patent: May 10, 2022

(54) ELECTROCHEMICAL DEVICE AND METHOD FOR OPERATING AN ELECTROCHEMICAL DEVICE

(71) Applicant: H-TEC SYSTEMS GmbH, Augsburg (DE)

(72) Inventors: Joachim Herrmann, Diedorf (DE); Frank Allebrod, Lübeck (DE)

(73) Assignee: H-TEC SYSTEMS GmbH, Augsburg (DE)

( * ) Notice: Subject to any disclaimer, the term of this patent is extended or adjusted under 35 U.S.C. 154(b) by 152 days.

(21) Appl. No.: 16/606,010

(22) PCT Filed: Apr. 19, 2018

(86) PCT No.: PCT/EP2018/060123
§ 371 (c)(1),
(2) Date: Oct. 17, 2019

(87) PCT Pub. No.: WO2018/193071
PCT Pub. Date: Oct. 25, 2018

(65) Prior Publication Data
US 2020/0040474 A1  Feb. 6, 2020

(30) Foreign Application Priority Data
Apr. 20, 2017  (DE) ............... 10 2017 108 440.1

(51) Int. Cl.
*C25B 15/08* (2006.01)
*C25B 1/04* (2021.01)
(Continued)

(52) U.S. Cl.
CPC ............ *C25B 15/08* (2013.01); *C25B 1/04* (2013.01); *C25B 9/19* (2021.01); *C25B 9/73* (2021.01);
(Continued)

(58) Field of Classification Search
None
See application file for complete search history.

(56) References Cited

U.S. PATENT DOCUMENTS 3,926,676 A    12/1975  Frie et al.
4,339,324 A *  7/1982  Haas ..................... C25B 9/77
                                                204/270
(Continued)

FOREIGN PATENT DOCUMENTS

DE   10 2009 003 777 A1   12/2009
EP         1 968 149 A1    9/2008

OTHER PUBLICATIONS

Search Report dated Nov. 24, 2017 issued in corresponding DE patent application No. 10 2017 108 440.1 (and partial English translation).
(Continued)

*Primary Examiner* — Harry D Wilkins, III
(74) *Attorney, Agent, or Firm* — Posz Law Group, PLC (57) ABSTRACT

An electrochemistry device, in particular an electrolysis device, in particular a polymer electrolyte membrane electrolysis device, has at least one cell unit, which includes at least one first electrochemical cell and at least one second electrochemical cell, and has at least one fluid supply unit for supplying the cell unit with at least one fluid, in particular with water, which at least one fluid supply unit includes at least one first fluid supply path extending at least section-wise through the first electrochemical cell, and at least one second fluid supply path extending at least section-wise through the second electrochemical cell, the fluid supply unit is designed in such a way that, in at least one normal operating state, a volume flow of the fluid through the first electrochemical cell and through the second electrochemical cell is at least substantially identical.

11 Claims, 3 Drawing Sheets

(51) Int. Cl.
  *C25B 9/73* (2021.01)
  *C25B 9/19* (2021.01)
  *H01M 8/2483* (2016.01)
  *H01M 8/2484* (2016.01)
  *H01M 8/04082* (2016.01)
  *H01M 8/10* (2016.01)

(52) U.S. Cl.
  CPC ...... *H01M 8/04201* (2013.01); *H01M 8/2483* (2016.02); *H01M 8/2484* (2016.02); *H01M 2008/1095* (2013.01)

(56) References Cited

U.S. PATENT DOCUMENTS

| | | | | |
|---|---|---|---|---|
| 4,950,370 | A | * | 8/1990 | Tarancon ................. C25B 9/70 205/619 |
| 2009/0301868 | A1 | | 12/2009 | Swalla |
| 2011/0132748 | A1 | | 6/2011 | Haryu et al. |
| 2011/0266142 | A1 | * | 11/2011 | Norman ................... C25B 9/05 204/257 |
| 2016/0002798 | A1 | * | 1/2016 | Romer ................... C25B 11/02 204/257 |
| 2016/0060776 | A1 | * | 3/2016 | Kawajiri ................. C25B 9/70 205/637 |

OTHER PUBLICATIONS

International Search Report dated Jul. 27, 2018 issued in corresponding International Patent Application No. PCT/EP2018/060123.
International Preliminary Report on Patentability dated Oct. 22, 2019 issued in corresponding International Patent Application No. PCT/EP2018/060123.

\* cited by examiner

ELECTROCHEMICAL DEVICE AND METHOD FOR OPERATING AN ELECTROCHEMICAL DEVICE

CROSS REFERENCE TO RELATED APPLICATIONS

This application is a U.S. national stage application of PCT/EP2018/060123 filed on Apr. 19, 2018, which is based on German Patent Application No. 10 2017 108 440.1 filed on Apr. 20, 2017, the contents of which are incorporated herein by reference.

PRIOR ART

The invention relates to an electrochemistry device, and to a method for operating an electrochemistry device.

From the prior art, electrolyzers are known which have a cell stack, often also referred to as "stack", which has a multiplicity of electrolysis cells connected in series. For example in the case of hydrogen electrolyzers for obtaining hydrogen and oxygen from electrochemical splitting of water, the cell stack is supplied continuously with water, which functions simultaneously as reactant and as coolant.

It is an object of the invention in particular to provide improved characteristics with regard to reliable and/or efficient operation of an electrochemistry device, in particular of an electrolysis device. Furthermore, it is an object of the invention in particular to achieve a reliable and/or uniform supply of fluid to an electrochemistry device. It is furthermore an object of the invention in particular to provide a structurally simple and at the same time efficient geometry of a fluid supply.

ADVANTAGES OF THE INVENTION

The invention proceeds from an electrochemistry device, in particular an electrolysis device, in particular a polymer electrolyte membrane electrolysis device, having at least one cell unit, which comprises at least one first electrochemical cell and at least one second electrochemical cell, and having at least one fluid supply unit for supplying the cell unit with at least one fluid, in particular with water, which at least one fluid supply unit comprises at least one first fluid supply path extending at least section-wise through the first electrochemical cell, and at least one second fluid supply path extending at least section-wise through the second electrochemical cell.

It is proposed that the fluid supply unit is designed such that, in at least one normal operating state, a volume flow of the fluid through the first electrochemical cell and through the second electrochemical cell is at least substantially identical.

By means of the embodiment according to the invention, it is possible in particular to achieve reliable and/or efficient operation. Furthermore, an electrochemistry device having advantageous characteristics with regard to a supply of fluid can be provided. Furthermore, structural simplicity and/or a reduced variety of parts can be achieved. Furthermore, a uniform pressure distribution in a cell stack can be achieved. It is advantageously possible for electrochemical cells to be supplied with fluid, in particular with water, in a uniform manner. Furthermore, in particular in the case of cell stacks with a large number of individual cells and/or for long cell stacks, a uniform and/or comprehensive supply of fluid can be achieved. Non-uniform heating can advantageously be avoided. It is furthermore advantageously possible to realize a high degree of leak-tightness of a cell stack. It is furthermore possible to achieve a high level of efficiency, in particular of hydrogen generation. It is advantageously possible, for achieving a uniform supply of fluid, to at least substantially omit regulating valves or the like.

An "electrochemistry device" is to be understood in particular to mean a, preferably functional, part of an appliance and/or of a machine, in particular of an electrolyzer, which is provided for carrying out at least one at least partially electrochemical working step. In particular, the electrochemistry device may also comprise the entire appliance and/or the entire machine. The electrochemistry device is preferably provided for converting electrical energy into chemical bond energy and/or chemical bond energy into electrical energy. In particular, in the normal operating state, at least one chemical reaction takes place that is linked to an electrical current, in particular a redox reaction. For example, the electrochemistry device may comprise a fuel cell device, a battery device, a measuring unit device, a generator device, an analysis device, an electrodeposition device, an anodizing device, an electroplating device, a redox reactor device or the like. The electrochemistry device is preferably designed as an electrolysis device, particularly preferably as a hydrogen electrolysis device, which is provided in particular for the electrochemical splitting of water into hydrogen and oxygen. The electrochemistry device may be provided for providing at least one gas, in particular hydrogen, with a positive pressure in relation to an environment, in particular with a pressure of at least 1 bar, wherein pressures of at least 5 bar, at least 10 bar, at least 15 bar, at least 20 bar, at least 30 bar or even higher pressures are also conceivable. In particular, the electrochemistry device may be provided for connection to a gas container, in particular a hydrogen tank, wherein it is conceivable that an operating pressure of the electrochemistry device is adaptable and/or adapted to a filling level of the gas container. For example, it is conceivable that the electrochemistry device generates the gas counter to a filling pressure of the gas container and fills the latter in particular without the use of a compressor or the like. It is alternatively also conceivable that the electrochemistry device is operated in a manner at least substantially free from a positive pressure. It is furthermore conceivable that the electrochemistry device is operable at a constant pressure and/or, in the normal operating state, is operated with a constant working pressure. In this case in particular, a combination with a compressor is conceivable. Furthermore, the electrochemistry device may a high-pressure electrolysis device and be provided in particular for generating and/or providing at least one gas, in particular hydrogen, with a pressure of at least 50 bar, preferably of at least 70 bar and particularly preferably of at least 100 bar or even higher. "Provided" is to be understood in particular to mean specially programmed, configured and/or equipped. The statement that an object is provided for a particular function is to be understood in particular to mean that the object performs and/or carries out said particular function in at least one state of use and/or operating state.

An "electrochemical cell" is to be understood in particular to mean a functional unit by means of which at least one electrochemical reaction can be performed, in particular an electrochemical reaction of the type for the performing of which the electrochemistry device is provided. For example, the electrochemical cell may be a fuel cell, a battery cell, a measuring cell, a redox cell or the like. The electrochemical cell is advantageously an electrolysis cell. The electrochemical cell is particularly advantageously a cell-stack-compatible electrolysis cell, in particular of an electrolysis cell stack. The electrochemical cell advantageously comprises at least one anode at which, preferably, oxygen is formed in the normal operating state. The electrochemical cell preferably comprises at least one cathode at which, preferably, hydrogen is formed in the normal operating state. The electrochemical cell advantageously comprises at least one membrane, in particular an advantageously selectively proton-conducting membrane, preferably a polymer electrolyte membrane. The anode and the cathode are particularly preferably separated from one another at least by the membrane. In particular, the anode and/or the cathode is areal and/or of layered form and/or a layer and/or coating. The membrane is formed preferably at least partially, and particularly preferably at least predominantly, from Nafion. The electrochemical cell preferably comprises at least one functional element, in particular a bipolar element, preferably a bipolar plate. In particular, a first side of the bipolar element forms an anode side of an electrochemical cell, and, in particular, a second side of the bipolar element forms a cathode side of another, immediately adjacent electrochemical cell. In particular, the first electrochemical cell and/or the second electrochemical cell may be designed as described in this context. In particular, at least some, advantageously at least a majority and particularly advantageously all of the electrochemical cells of the cell unit are of at least substantially identical design and/or of the same and/or analogous construction. In this context, "at least substantially identical" objects are to be understood in particular to mean objects which are constructed such that they can in each case perform a common function and, in terms of their construction, aside from manufacturing tolerances, differ from one another at most by individual elements which are not of importance for the common function, and advantageously objects which, aside from manufacturing tolerances and/or within the scope of possibilities in terms of manufacturing technology, are of identical form, wherein identical objects are in particular also to be understood to mean objects which are symmetrical with respect to one another. The expression "at least predominantly" is to be understood here in particular to mean at least 55%, advantageously at least 65%, preferably at least 75%, particularly preferably at least 85% and particularly advantageously at least 95%, but in particular also completely. The expression "at least a majority" is to be understood here in particular to mean at least 55%, advantageously at least 65%, preferably at least 75%, particularly preferably at least 85% and particularly advantageously at least 95%, but in particular also 100%.

The cell unit preferably comprises a plurality, preferably a multiplicity, of electrochemical cells, which are in particular of at least substantially identical design. In particular, the first electrochemical cell and/or the second electrochemical cell may in each case be an arbitrary electrochemical cell, arranged in particular at an edge or centrally, of the cell unit, wherein, in particular, the designations "first" and "second" are to be understood not imperatively but merely possibly as describing a sequence and/or arrangement. In particular, it is conceivable that the first electrochemical cell and/or the second electrochemical cell are arranged, in particular directly, adjacently or non-adjacently. In particular, the first electrochemical cell may differ from an electrochemical cell of the cell unit which would be denoted by a number one in accordance with a numbering of electrochemical cells of the cell unit, for example proceeding from one side. The same applies in particular to the second electrochemical cell, in particular to a corresponding electrochemical cell with a number two. It is furthermore conceivable that features described with regard to the first electrochemical cell and the second electrochemical cell apply for at least a majority and/or for all electrochemical cells of the cell unit.

The cell unit advantageously comprises at least one cell stack, in particular an electrolysis stack, which comprises a plurality, preferably a multiplicity, of electrochemical cells arranged in a stacked manner. Preferably, the cell stack comprises at least the first electrochemical cell and/or the second electrochemical cell. The electrochemical cells of the cell stack are advantageously of at least substantially identical design. The cell stack preferably has repeating units which comprise multiple different functional elements, advantageously different functional cell stack elements, for example, in particular in the stated sequence, at least one bipolar plate and/or at least one screen plate and/or perforated plate or the like and/or at least one gas diffusion layer, in particular one oxygen diffusion layer, advantageously a titanium felt and/or a membrane, advantageously a polymer electrolyte membrane, and/or a further gas diffusion layer, in particular a hydrogen diffusion layer, advantageously a carbon felt, and/or a compression buffer, which in particular comprises a further screen plate and/or perforated plate, in particular a compression pad, advantageously an expanded metal. A bipolar plate and/or a perforated plate and/or a screen plate and/or an expanded metal and/or some other metallic cell stack element is advantageously formed at least partially, advantageously at least predominantly, from titanium and/or from high-grade steel and/or from at least one coated metal. In particular, in each case one electrochemical cell extends from one bipolar plate to a next bipolar plate. The cell stack may in this case comprise any desired number of electrochemical cells, for example ten or 20 or 30 or 50 or 100 or 150 or 200 or more or fewer or any desired number in between. The cell unit advantageously has exactly one cell stack. It is however also conceivable for the cell unit to comprise multiple cell stacks which are in particular of at least substantially identical design or of different design and of which at least some may be connected electrically and/or hydraulically in line and/or in series. The first electrochemical cell and the second electrochemical cell are advantageously arranged in a common cell stack. It is however also conceivable for the first electrochemical cell and the second electrochemical cell to be arranged in different cell stacks.

The cell unit preferably has at least one first end plate and/or at least one second end plate. The electrochemical cells of the cell stack are particularly preferably arranged, in particular closely stacked, between the end plates. The first end plate and the second end plate are preferably connected to one another. The first end plate and the second end plate particularly preferably exert a pressure force on the cell stack from opposite sides, and in particular in a direction perpendicular and/or at least substantially perpendicular to a stack direction. The stack direction preferably corresponds to a direction in which the cell stack is constructed from electrochemical cells. In particular, the stack direction runs perpendicular and/or at least substantially perpendicular to a main extent plane of the first electrochemical cell and/or perpendicular to a main extent plane of at least one, in particular plate-like, cell stack element. The cell stack is preferably configured such that main extent planes of the electrochemical cells of the cell stack are arranged parallel to one another and in particular perpendicular to the stack direction. Preferably, in the normal operating state, a working voltage prevails between a foremost electrochemical cell, which bears in particular against the first end plate, and a rearmost electrochemical cell, which bears in particular against the second end plate. In particular in the case in which the electrochemistry device is designed as an electrolysis device, it is advantageously the case that, in the normal operating state, an individual working voltage of at least 0.5 V, advantageously of at least 1 V, particularly advantageously of at least 1.2 V and preferably of at least 1.5 V and/or of at most 10 V, advantageously of at most 5 V, particularly advantageously of at most 2.5 V and preferably of at most 2 V, prevails in each case across the electrochemical cells, in particular of the cell stack. However, in particular for other situations, for example for a fuel cell device, it is conceivable that, in the normal operating state, an individual working voltage of less than 1 V or else less than 0.5 V or even lower or for example also greater than 10 V or greater than 20 V or greater than 50 V or even greater prevails in each case across the electrochemical cells, in particular of the cell stack. A person skilled in the art will select a suitable individual working voltage as desired in accordance with a usage situation. A "main extent plane" of an object is to be understood in particular to mean a plane which is parallel to a largest side surface of a smallest imaginary cuboid still just completely enclosing the object and which in particular runs through the central point of the cuboid. Here, "at least substantially perpendicular" is to be understood to mean in particular an orientation of a direction relative to a reference direction, in particular in a reference plane, wherein the direction and the reference direction enclose an angle which deviates from a right angle in particular by less than 8°, advantageously by less than 5° and particularly advantageously by less than 2°.

In particular, the fluid supply unit is provided for supplying the electrochemical cells of the cell unit, in particular the first electrochemical cell and/or the second electrochemical cell, with at least one fluid, in particular with water, advantageously with deionized water. The fluid supply unit is advantageously provided for providing water as reactant of an electrolytic water splitting process and/or as coolant to the cell unit and/or to the cell stack and/or to the electrochemical cells of the cell unit. The fluid supply unit preferably has at least one port which is connectable and/or connected to an, in particular external, fluid supply, in particular to a fluid circuit, preferably to a water circuit. It is also conceivable that the electrochemistry device has the fluid supply. For example, the fluid supply may comprise a fluid supply circuit, in particular with at least one pump and/or with at least one filter and/or with at least one fluid reservoir or the like. In particular, the fluid supply unit is provided for forming at least a part of a fluid supply circuit. Preferably, in the normal operating state, the cell unit is flushed through with the fluid, in particular continuously and/or with a total flow which is constant and/or adaptable to a respective operating state, for example in a manner dependent on a level of power consumption, by means of the fluid unit. Preferably, the cell unit, in particular the cell stack, and the fluid supply unit are formed at least partially integrally. The fluid supply unit preferably has no regulating valve for equalizing the volume flows through the first electrochemical cell and the second electrochemical cell. A "fluid supply path" is to be understood in particular to mean a region and/or a portion of a fluid line system, in particular of a fluid line and/or of a volume which can be flowed through and/or, in particular in the normal operating state, is flowed through. In particular, the fluid supply path may comprise a fluid line and/or a fluid line portion. In particular, the fluid supply unit comprises at least one fluid supply path for each electrochemical cell of the cell stack, wherein, advantageously, in each case one fluid supply path is, in particular uniquely, assigned to in each case one electrochemical cell and/or leads through the corresponding electrochemical cell. The statement that a first object and a second object are formed "at least partially integrally" is to be understood in particular to mean that at least one element and/or part of the first object and at least one element and/or part of the second object are formed integrally.

A "normal operating state" is to be understood in particular to mean a state in which the electrochemistry device and/or the cell unit is operated within its specified operating parameters and/or in a fault-free manner and/or in accordance with its intended use. In particular, the normal operating state involves continuous power consumption and/or output and/or a continuous conversion of reactants and/or products, in each case in particular with an at least substantially constant rate. Furthermore, the normal operating state may alternatively or additionally involve a start-up and/or a shut-down and/or an, in particular targeted and/or open-loop-controlled and/or closed-loop-controlled, switchover from an, in particular fault-free, operating state to at least one, in particular fault-free, other operating state of the electrochemistry device and/or of the cell unit. Preferably, the electrochemistry device, in particular the cell unit and/or the fluid supply unit, is, preferably in the normal operating state, connected to at least one energy supply and/or to at least one fluid supply, in particular a water line and/or a gas line. A "volume flow through an electrochemical cell" is to be understood in particular to mean a volume of a fluid, in particular of water, which, per unit of time, flows through a cross section of at least a partial region of the electrochemical cell, in particular through a cross section of at least an electrochemically active region of the electrochemical cell and/or through a cross section of the electrochemical cell, in particular through a cross section perpendicular to a flow direction of the fluid through at least the partial region. The statement that the volume flow of the fluid through the first electrochemical cell and through the second electrochemical cell is at least substantially identical is to be understood in particular to mean that the volume flow through the first cell and the volume flow through the second cell deviate from one another by less than 30%, advantageously by less than 20%, particularly advantageously by less than 15%, preferably by less than 10%, preferably by less than 5% and particularly preferably by less than 2%. The volume flow in particular differs from 0.

In a further embodiment of the invention, it is proposed that, in the normal operating state, a pressure loss in the first fluid supply path at least substantially corresponds to a pressure loss in the second fluid supply path. In particular, a pressure drop from an inlet of the first fluid supply path to an outlet of the first fluid supply path at least substantially corresponds to a pressure drop from an inlet of the second fluid supply path to an outlet of the second fluid supply path. In particular, it is conceivable that a local pressure distribution in the first fluid supply path deviates from a local pressure distribution in the second fluid supply path at least section-wise, and/or is at least substantially identical thereto at least section-wise. In particular, in the normal operating state, the cell unit is at least substantially free from a pressure gradient, extending in particular completely across multiple electrochemical cells, in the direction of the stack direction. The first fluid supply path and the second fluid supply path are advantageously hydraulically balanced. In this context, "at least substantially" is to be understood in particular to mean that a deviation from a predefined value corresponds to in particular less than 15%, preferably less than 10% and particularly preferably less than 5% of the predefined value. A non-uniform fluid supply can advantageously be avoided in this way.

In one advantageous embodiment of the invention, it is proposed that the first fluid supply path and the second fluid supply path are at least substantially of equal length. In particular, a first cell supply portion, arranged within the first electrochemical cell, of the first fluid supply path is of at least substantially identical design, and/or at least substantially of equal length, in relation to a second cell supply portion, arranged within the second electrochemical cell, of the second fluid supply path. Preferably, the first fluid supply path and the second fluid supply path have, at least section-wise, in particular outside the first electrochemical cell and/or the second electrochemical cell, an at least substantially identical cross-sectional area. Structural simplicity can advantageously be achieved in this way. Furthermore, it is advantageously possible in this way for a complexity of a fluid supply geometry to be reduced. Furthermore, in this way, it is advantageously possible to omit the use of regulating valves for achieving a uniform throughflow.

It is however basically also conceivable for volume flows through the first electrochemical cell and the second electrochemical cell to be balanced in some other way, for example by means of suitable regulating valves, in particular in combination with at least one open-loop control and/or closed-loop control unit and/or in combination with at least one pressure sensor and/or flow sensor or the like, and/or through suitable selection of, in particular variable, line diameters and/or line cross sections and/or variable thicknesses of electrochemical cells or the like.

In a particularly advantageous embodiment of the invention, it is proposed that the first fluid supply path and the second fluid supply path lead from a common inlet, in particular an inlet of the fluid supply unit, to the electrochemical cells and/or from the electrochemical cells to a common outlet, in particular an outlet of the fluid supply unit. In particular, a number of inlets and/or outlets of the fluid supply unit is smaller than, and advantageously at least 10 times or 20 times smaller, or smaller still, than a number of fluid supply paths and/or a number of electrochemical cells. Preferably, the first end plate has the inlet. The second end plate particularly preferably has the outlet. The inlet is preferably arranged in front of the cell unit as viewed in a stack direction. The outlet is advantageously arranged behind the cell unit as viewed in the stack direction. The inlet and the outlet are preferably arranged offset to one another as viewed in the stack direction. The first fluid supply path and the second fluid supply path advantageously extend at least section-wise through a common fluid line, which in particular differs from a line portion of the inlet and/or from a line portion of the outlet. The inlet and/or the outlet is advantageously, in particular in each case, connected to a port of the fluid supply unit and/or provided for connection to the fluid supply. In this way, an electrochemistry device can advantageously be incorporated easily and/or reliably into a fluid circuit.

It is furthermore proposed that the fluid supply unit has at least one inlet channel and at least one outlet channel, which are provided for conducting the fluid, in the normal operating state, in an inlet flow direction and in an outlet flow direction which run at least substantially parallel to one another. Preferably, the inlet direction and/or the outlet direction runs at least substantially parallel to the stack direction. In particular, the inlet channel is connected to the inlet and/or the outlet channel is connected to the outlet. The inlet direction and the outlet direction are preferably identical. A longitudinal axis of the inlet channel advantageously runs parallel to a longitudinal axis of the outlet channel. In particular, the inlet channel and the outlet channel are arranged offset with respect to one another, in particular as viewed along the stack direction. Preferably, at least some, particularly preferably all, fluid supply paths of the cell stack run at least section-wise through the inlet channel and/or at least section-wise through the outlet channel. In particular, the inlet channel and/or the outlet channel is a common fluid line of multiple, in particular all, electrochemical cells of the cell stack and/or of the cell unit. Here, "at least substantially parallel" is to be understood in particular to mean an orientation of a direction relative to a reference direction, in particular in a plane, wherein the direction has a deviation of in particular less than 8°, advantageously less than 5° and particularly advantageously less than 2° relative to the reference direction. In this way, it is advantageously possible to achieve a uniform flow through an electrochemistry device that can be easily integrated into a fluid circuit.

It is furthermore proposed that a sum of a length of a first inlet portion and of a length of a first outlet portion of the first fluid supply path at least substantially corresponds to a sum of a length of a second inlet portion and of a length of a second outlet portion of the second fluid supply path. For example, the first inlet portion is shorter than the second inlet portion by the same or at least substantially the same extent as the first outlet portion is longer than the second outlet portion, or vice versa. In this way, it is advantageously possible to provide a fluid supply geometry which permits a simple and uniform supply.

Leaks in a cell stack and/or pressure differences along a stack direction can be avoided in particular if a pressure loss in the first inlet portion is greater than a pressure loss in the second inlet portion, and a pressure loss in the first outlet portion is smaller than a pressure loss in the second outlet portion. Preferably, a sum of all partial pressure losses in the first fluid supply path at least substantially corresponds to a sum of all partial pressure losses in the second fluid supply path, wherein this is in each case in particular a sum at least of an inlet pressure loss, of a cell pressure loss and of an outlet pressure loss.

In one advantageous embodiment of the invention, it is proposed that the inlet channel at least partially forms the first inlet portion and the second inlet portion and/or the outlet channel at least partially forms the first outlet portion and the second outlet portion. The first inlet portion and the second inlet portion are advantageously identical at least section-wise, and, in particular, identical at least section-wise to the inlet channel. The first outlet portion and the second outlet portion are preferably identical at least section-wise, and, in particular, identical at least section-wise to the outlet channel. In this way, it is advantageously possible to use a common inlet and/or a common outlet for electrochemical cells, for example of a cell stack.

In one particularly advantageous embodiment of the invention, it is proposed that the first electrochemical cell has at least one functional element which forms at least a section of the first fluid supply path and at least a section of the second fluid supply path. In particular, multiple functional elements, arranged in particular in a stacked manner, of the cell unit, in particular of the cell stack, jointly form the first fluid supply path and/or jointly form the second fluid path. Preferably, functional elements of different electrochemical cells form at least a section of the inlet channel and/or the inlet channel and/or at least a section of the outlet channel and/or the outlet channel. In this way, a compact design can advantageously be obtained.

It is furthermore proposed that the functional element is a functional cell stack element. In particular, the cell stack element may be formed in the manner of one of the cell stack elements mentioned above. Preferably, the cell stack element is of plate-shaped and/or plate-like form and/or designed to be stackable with other cell stack elements to form the cell stack. The cell stack element preferably has at least one recess, in particular one leadthrough, which is provided for being arranged adjacent to, in particular so as to be in alignment with, leadthroughs of other cell stack elements and/or in series therewith, such that a fluid channel is advantageously formed by the leadthroughs. Preferably, the different cell stack elements of the cell stack jointly, in particular together with the end plates, form the inlet channel and/or the outlet channel and/or in each case at least a section of in each case one fluid supply path for the electrochemical cells of the cell stack. Advantageously, the first fluid supply path runs, in particular in this sequence, from the inlet, through the inlet channel which is in particular formed by a multiplicity of stacked cell stack elements of different stacked electrochemical cells and which is in particular arranged parallel to the stack direction, and/or through the first electrochemical cell, and/or through the outlet channel which is in particular formed by a multiplicity of stacked cell stack elements of different stacked electrochemical cells and which is in particular arranged parallel to the stack direction, to the outlet. Preferably, the first fluid supply path runs through the first electrochemical cell in a direction which runs at least substantially perpendicular to the stack direction and/or at least substantially parallel to a main extent plane of the first electrochemical cell. In this way, an electrochemistry device can be provided which is easy and/or inexpensive to manufacture.

A high level of reliability and/or a high level of efficiency and/or advantageous characteristics with regard to operation can be achieved by means of an electrolyzer having at least one electrochemistry device according to the invention.

The invention furthermore proceeds from a method for operating an electrochemistry device, in particular an electrolysis device, in particular a polymer electrolyte membrane electrolysis device, having at least one cell unit, which comprises at least one first electrochemical cell and at least one second electrochemical cell.

It is proposed that the first electrochemical cell and the second electrochemical cell are flowed through by a fluid, in particular by water, such that a volume flow of the fluid through the first electrochemical cell and through the second electrochemical cell is at least substantially identical.

By means of the method according to the invention, it is possible in particular to achieve reliable and/or efficient operation. Furthermore, an electrochemistry device having advantageous characteristics with regard to a supply of fluid can be provided. Furthermore, structural simplicity and/or a reduced variety of parts can be achieved. Furthermore, a uniform pressure distribution in a cell stack can be achieved. It is advantageously possible for electrochemical cells to be supplied with fluid, in particular with water, in a uniform manner. Furthermore, in particular in the case of cell stacks with a large number of individual cells, a uniform and/or comprehensive supply of fluid can be achieved. Non-uniform heating can advantageously be avoided. It is furthermore advantageously possible to realize a high degree of leak-tightness of a cell stack. It is furthermore possible to achieve a high level of efficiency, in particular of hydrogen generation. It is advantageously possible, for achieving a uniform supply of fluid, to at least substantially omit regulating valves or the like.

Here, the electrochemistry device according to the invention and the method according to the invention are not intended to be restricted to the uses and embodiments described above. In particular, the electrochemistry device according to the invention and the method according to the invention may, in order to perform a function described herein, have a number of individual elements and/or components and/or units and/or method steps that differs from a number stated herein. Furthermore, with regard to the value ranges specified in this disclosure, it is also intended that values lying within the stated limits are considered as disclosed and usable as desired.

DRAWINGS

Further advantages emerge from the following description of the drawings. The drawings illustrate exemplary embodiments of the invention. The drawings, the description and the claims contain numerous features in combination. A person skilled in the art will expediently also consider the features individually and combine these to form further meaningful combinations.

DESCRIPTION OF THE EXEMPLARY EMBODIMENTS

Figure 1:
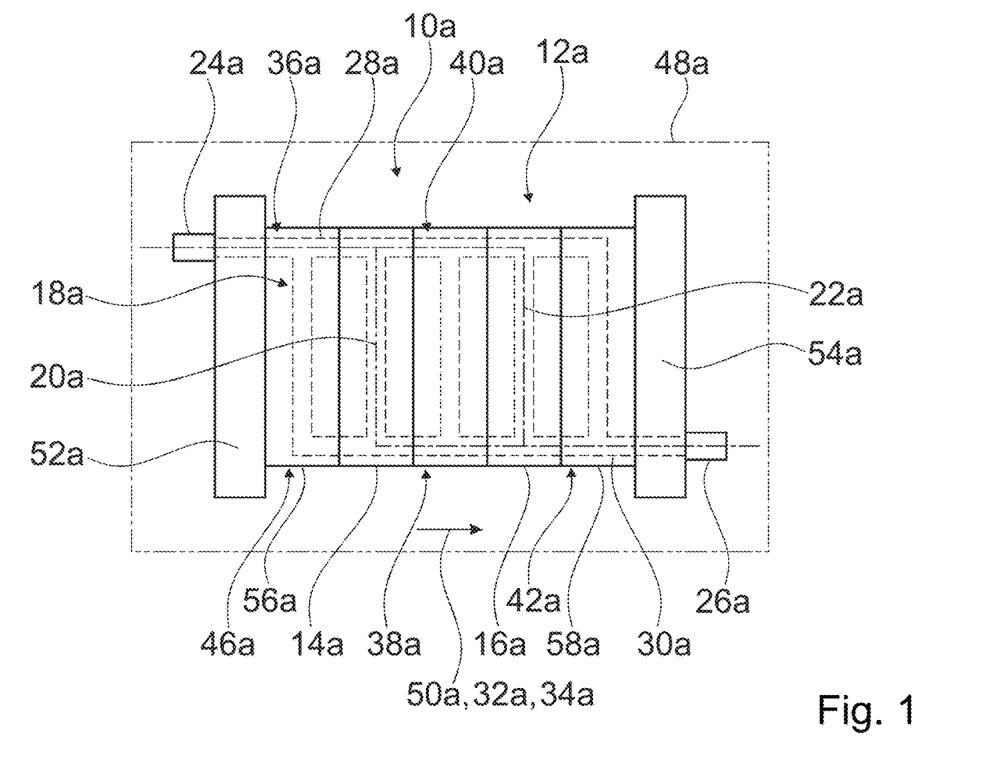
FIG. 1 shows an electrolyzer with an electrochemistry device in a schematic side view.

FIG. 1 shows an electrolyzer 48a with an electrochemistry device 10a in a schematic side view. The electrolyzer 48a is in the present case shown merely schematically, and may comprise components which are not illustrated, such as for example electrical connections, a housing, a water circuit, an open-loop and/or closed-loop control unit, or the like. The electrochemistry device 10a is, in the present case, designed as an electrolyzer device. In particular, the electrolysis device 10a is a hydrogen electrolysis device. As mentioned above, it is however also conceivable for the electrochemistry device 10a to be designed as a fuel cell device, a measuring unit device, an electroplating device or the like.

The electrochemistry device 10a has a cell unit 12a, which comprises at least one first electrochemical cell 14a and at least one second electrochemical cell 16a. In the present case, the cell unit 12a has a multiplicity of electrochemical cells 14a, 16a, of which, for the sake of clarity, only five are schematically illustrated, and which are not all denoted by reference designations. Furthermore, the electrochemical cells 14a, 16a of the cell unit 12a are not illustrated true to scale in FIG. 1. In particular, the electrochemical cells 14a, 16a of the cell unit 12a may be of much flatter design than in the schematic illustration of FIG. 1. For example, the cell unit 12a may comprise 20 or 30 or 50 or 100 or 150 or 200 electrochemical cells.

The cell unit 12a has a cell stack 46a which comprises a multiplicity of electrochemical cells 14a, 16a arranged in a stacked manner. In the present case, all electrochemical cells 14a, 16a of the cell unit 12a are stacked to form the cell stack 46a. Furthermore, in the present case, the electrochemical cells 14a, 16a of the cell unit 12a are of at least substantially identical design with respect to one another. In the present case, the cell stack 46*a* is an electrolysis stack. The electrochemical cells 14*a*, 16*a* of the cell unit 12*a* are stacked in a stack direction 50*a*. The stack direction 50*a* corresponds to a stack thickness direction of the cell stack 46*a*. In the present case, the stack direction 50*a* runs perpendicular to a main extent plane of the first electrochemical cell 14*a*. Furthermore, in the present case, main extent planes of the electrochemical cells 14*a*, 16*a* of the cell unit 12*a* are arranged parallel to one another.

The cell unit 12*a* has a first end plate 52*a* and a second end plate 54*a*. The first end plate 52*a* and the second end plate 54*a* delimit the electrochemical cells 14*a*, 16*a* of the cell stack 46*a* toward opposite sides of the cell stack 46*a*. The end plates 52*a*, 54*a* are for example connected to one another by means of connecting struts and exert a pressure force on the electrochemical cells 14*a*, 16*a* of the cell stack 46*a*, which pressure force in particular counteracts a pressure owing to a formation of hydrogen gas and/or oxygen gas, or in particular effects or at least contributes to leak-tightness of the electrochemical cells 14*a*, 16*a*, which are pressed against one another, with respect to one another and/or leak-tightness of the respective electrochemical cell 14*a*, 16*a*.

The electrochemistry device 10*a* has contact elements (not shown) for connection to a power supply. In a normal operating state, the cell unit 12*a* is supplied with electrical power via the contact elements. Here, an overall voltage prevails between a foremost electrochemical cell 56*a*, which bears in particular against the first end plate 52*a*, and a rearmost electrochemical cell 58*a*, which bears in particular against the second end plate 54*a*. In the normal operating state, a voltage of between approximately 1 V and approximately 2.5 V prevails in each case across individual electrochemical cells 14*a*, 16*a*, 56*a*, 58*a* of the cell unit 12*a*, as has in particular also been mentioned above.

The electrochemistry device 10*a* has a fluid supply unit 18*a*. The fluid supply unit 18*a* is in the present case provided for supplying the cell unit 12*a*, in particular the cell stack 46*a*, with a fluid. In the present case, the fluid is water, in particular deionized water. The fluid serves as a starting product for an electrolytic reaction. Furthermore, in the present case, the fluid additionally serves as coolant. It is however basically conceivable for the electrochemistry device 10*a* to have multiple different fluid supply units 18*a* which are provided for separate supply with, in particular, different fluids, for example with reaction gases, coolants, reactant fluids or the like.

The fluid supply unit 18*a* has at least one first fluid supply path 20*a* extending at least section-wise through the first electrochemical cell 14*a*. Furthermore, the fluid supply unit 18*a* has at least one second fluid supply path 22*a*, which extends at least section-wise through the second electrochemical cell 16*a*. Courses of the first fluid supply path 20*a* and of the second fluid supply path 22*a* are schematically illustrated as lines in FIG. 1. The first fluid supply path 20*a* and the second fluid supply path 22*a* each comprise a volume that can be flowed through by the fluid.

The fluid supply unit 18*a* is designed such that, in the normal operating state, a volume flow of the fluid through the first electrochemical cell 14*a* and through the second electrochemical cell 16*a* is at least substantially identical. In particular, in the normal operating state, the electrochemistry device 10*a* produces hydrogen gas. Furthermore, in the normal operating state, the cell unit 12*a* is supplied continuously with a fluid flow, for example by means of a fluid circuit (not shown) and/or a pump (not shown). In the present case, the first electrochemical cell 14*a* and the second electrochemical cell 16*a* are of at least substantially identical design. In particular, the first electrochemical cell 14*a* and the second electrochemical cell 16*a* have an interior space of at least substantially identical design, and/or an inner cross section of at least substantially identical design, which is in particular flowed through by the fluid in the normal operating state. In the present case, a volume flow through each of the electrochemical cells 14*a*, 16*a*, 56*a*, 58*a* of the cell unit 12*a* is at least substantially identical. The electrochemical cells 14*a*, 16*a*, 56*a*, 58*a* of the cell stack 46*a* are, in the normal operating state, flowed through uniformly and/or equally and/or with identical volume flows.

In a method for operating the electrochemistry device 10*a*, the first electrochemical cell 14*a* and the second electrochemical cell 16*a* are flowed through by the fluid such that a volume flow of the fluid through the first electrochemical cell 14*a* and through the second electrochemical cell 16*a* is at least substantially identical.

Furthermore, in the normal operating state, a pressure loss in the first fluid supply path 20*a* at least substantially corresponds to a pressure loss in the second fluid supply path 22*a*. In the present case, a pressure loss in each of the electrochemical cells 14*a*, 16*a*, 56*a*, 58*a* of the cell unit 12*a* is at least substantially identical. Furthermore, in the present case, the cell stack 46*a* is free from a pressure gradient extending across multiple electrochemical cells in the stack direction 50*a*. In particular, a pressure loss in the foremost electrochemical cell 56*a* at least substantially corresponds to a pressure loss in the rearmost electrochemical cell 58*a*.

The first fluid supply path 20*a* and the second fluid supply path 22*a* are at least substantially of equal length. In the present case, the fluid supply unit 18*a* comprises in each case one fluid supply path 20*a*, 22*a* for each electrochemical cell 14*a*, 16*a*, 56*a*, 58*a*, wherein the fluid supply paths 20*a*, 22*a* are in particular uniquely assigned to in each case one electrochemical cell 14*a*, 16*a*, 56*a*, 58*a*. For the sake of clarity, in FIG. 1, only five fluid supply paths 20*a*, 22*a* are illustrated, analogously to the electrochemical cells 14*a*, 16*a*, 56*a*, 58*a*, and only two are denoted by reference designations. Furthermore, in the present case, all of the fluid supply paths 20*a*, 22*a* are at least substantially of equal length.

The first fluid supply path 20*a* and the second fluid supply path 22*a* lead from a common inlet 24*a* to the electrochemical cells 14*a*, 16*a*. Furthermore, the first fluid supply path 20*a* and the second fluid supply path 22*a* lead from the electrochemical cells 14*a*, 16*a* to a common outlet 26*a*. The inlet 24*a* and the outlet 26*a* are connected to the fluid circuit (not shown). In the normal operating state, the fluid circulates from the inlet 24*a* through the cell stack 46*a* to the outlet 26*a*, from there through a return line and/or a fluid reservoir and/or a filter and/or a pump or the like, and back to the inlet 24*a*. The inlet 24*a* is connected to the first end plate 52*a* and/or is at least partially formed by the latter. The outlet 26*a* is connected to the second end plate 54*a* and/or is at least partially formed by the latter. The inlet 24*a* and the outlet 26*a* are arranged offset with respect to one another, in particular as viewed parallel to the stack direction 50*a*.

The fluid supply unit 18*a* has at least one inlet channel 28*a* and at least one outlet channel 30*a*, which are provided for conducting the fluid, in the normal operating state, in an inlet flow direction 32*a* and in an outlet flow direction 34*a* which run at least substantially parallel to one another. In the present case, the inlet flow direction 32*a* runs parallel to the outlet flow direction 34*a*. The inlet flow direction 32*a* runs parallel to the stack direction 50a. The outlet flow direction 34a runs parallel to the stack direction 50a.

A sum of a length of a first inlet portion 36a and of a length of a first outlet portion 38a of the first fluid supply path 20a at least substantially corresponds to a sum of a length of a second inlet portion 40a and of a length of a second outlet portion 42a of the second fluid supply path 22a. In particular, the first inlet portion 36a and the second inlet portion 40a respectively extend in each case from the inlet 24a to the first electrochemical cell 14a and to the second electrochemical cell 16a respectively. Furthermore, in the present case, the first outlet portion 38a and the second outlet portion 42a respectively extend in each case from the first electrochemical cell 14a and from the second electrochemical cell 16a respectively to the outlet 26a. In the present case, the first inlet portion 36a is shorter than the second inlet portion 40a. Furthermore, in the present case, the first outlet portion 38a is longer than the second outlet portion 42a, in particular by exactly the same extent.

A pressure loss in the first inlet portion 36a is greater than a pressure loss in the second inlet portion 40a. Furthermore, a pressure loss in the first outlet portion 38a is smaller than a pressure loss in the second outlet portion 42a. In particular, a sum of partial pressure losses in the first inlet portion 36a, in the first electrochemical cell 14a and in the first outlet portion 38a at least substantially corresponds to a sum of partial pressure losses in the second inlet portion 40a, in the second electrochemical cell 16a and in the second outlet portion 42a.

The inlet channel 28a at least partially, in particular completely, forms the first inlet portion 36a and the second inlet portion 40a. The outlet channel 30a at least partially, in particular completely, forms the first outlet portion 38a and the second outlet portion 42a. In the present case, in each case one fluid supply path 20a, 22a of the fluid supply unit 18a extends at least section-wise through the inlet channel 28a to in each case one electrochemical cell 14a, 16a, 56a, 58a of the cell unit 12a. Furthermore, in each case one fluid supply path 20a, 22a of the fluid supply unit 18a extends section-wise from in each case one electrochemical cell 14a, 16a, 56a, 58a of the cell unit 12a through the outlet channel 30a.

In the present case, that which has been described here by way of example for the first fluid supply path 20a and the second fluid supply path 22a applies analogously to all fluid supply paths 20a, 22a of the electrochemical cells 14a, 16a, 56a, 58a of the cell unit 12a.

Figure 2:
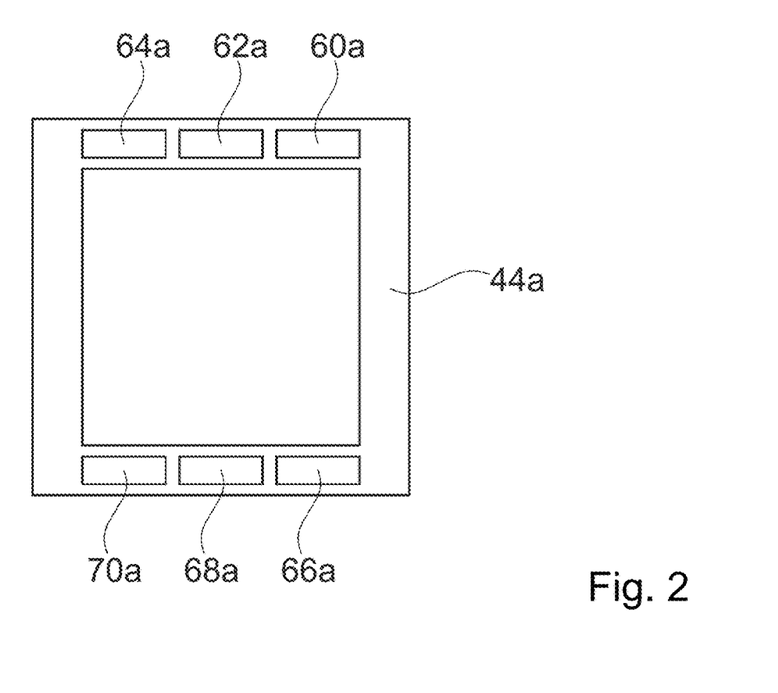
FIG. 2 shows a functional element of an electrochemical cell of the electrochemistry device in a schematic plan view.

FIG. 2 shows a functional element 44a of the first electrochemical cell 14a in a schematic plan view. In the present case, the functional element 44a is designed as a cell stack element. The functional element 44a is of plate-like form. The functional element 44a may for example be a bipolar plate, a pressure pad, perforated plate, a screen plate, a membrane or the like. As described above, the first electrochemical cell 14a is formed from a plurality of different functional elements 44a, in particular different functional cell stack elements, which are not individually illustrated in the figures. Furthermore, as described above, the cell stack 46a comprises a multiplicity of repeating units of different cell stack elements, which form the cell stack 46a and the electrochemical cells 14a, 16a, 56a, 58a thereof.

The functional element 44a forms at least a section of the first fluid supply path 20a and at least a section of the second fluid supply path 22a. A length of said portions at least substantially corresponds to a thickness of the functional element 44a, which lies in particular in a range from approximately 0.1 mm to several millimeters.

The functional element 44a has a first recess 60a which, in the present case, is designed as a leadthrough. The first recess 60a is provided for being arranged in a line, in particular in alignment, with other recesses, which are in particular of analogous design, of other functional elements, and/or for forming the inlet channel 28a together with said other recesses. The inlet channel 28a extends in particular through multiple different functional elements 44a of different electrochemical cells 14a, 16a, 56a, 58a. In the present case, the functional element 44a has three first recesses 60a, 62a, 64a of analogous design. Correspondingly, the fluid supply unit 18a has, in the present case, three inlet channels 28a which are of analogous design and which in particular run parallel.

The functional element 44a has a second recess 66a which, in the present case, is designed as a leadthrough. The second recess 66a is provided for being arranged in a line, in particular in alignment, with other recesses, which are in particular of analogous design, of other functional elements, and/or for forming the outlet channel 30a together with said other recesses. The outlet channel 30a extends in particular through multiple different functional elements 44a of different electrochemical cells 14a, 16a, 56a, 58a. In the present case, the functional element 44a has three second recesses 66a, 68a, 70a of analogous design. Correspondingly, the fluid supply unit 18a has, in the present case, three outlet channels 30a which are of analogous design and which in particular run parallel.

The recesses 60a, 62a, 64a, 66a, 68a, 70a are open toward an interior of the first electrochemical cell 14a, such that the first fluid supply path 20a can lead through the first electrochemical cell 14a. In particular, the first fluid supply path 20a branches off from the inlet channel 28a into an interior space of the first electrochemical cell 14a, and/or from the interior space of the first electrochemical cell 14a into the outlet channel 30a. The functional elements 44a of the cell stack 46a form the electrochemical cells 14a, 16a, 56a, 58a and the fluid supply paths 20a, 22a of the fluid supply unit 18a. The recesses 60a, 62a, 64a, 66a, 68a, 70a are arranged such that, together, they extend over at least a predominant part of a width of the functional element 44a, whereby it is advantageously possible for pressure gradients in a transverse direction to be avoided and/or for a uniform fluid throughflow to be achieved.

It is conceivable that the inlet channels 28a are cross-connected or that the fluid supply unit 18a has a single inlet channel 28a, which in particular extends over at least a predominant part of a width of the functional element 44a. The outlet channels 30a may analogously be cross-connected. Likewise, the fluid supply unit 18a may analogously have a single, wide outlet channel 30a.

Figure 3:
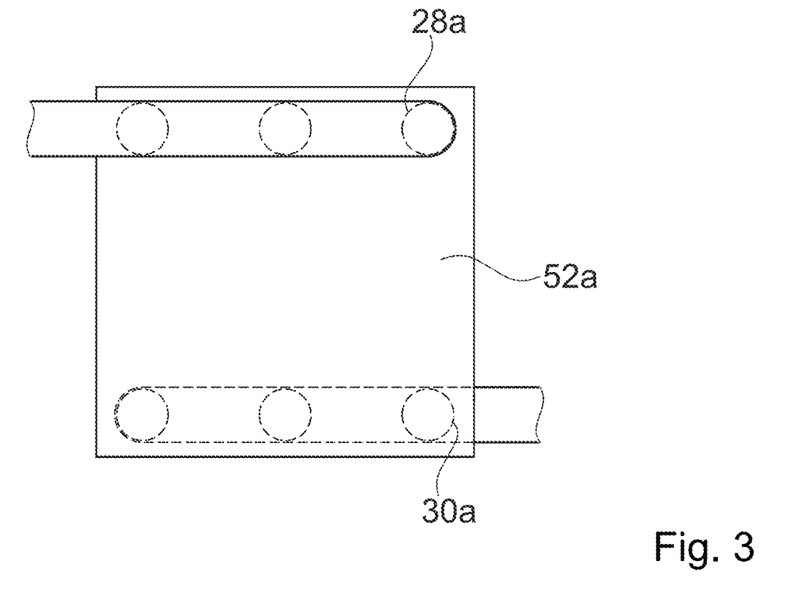
FIG. 3 shows the electrochemistry device in a schematic frontal view.

FIG. 3 shows the electrochemistry device 10a in a schematic frontal view as viewed in the stack direction 50a. In the present case, the inlet 24a is designed as a multiply branched line, wherein in each case one line branch is connected to one of the inlet channels 28a. Analogously, the outlet 26a is designed as a multiply branching line, wherein in each case one line branch is connected to one of the outlet channels 30a. In particular, it is thus the case that any fluid supply paths 20a, 22a are of equal length proceeding from a main line of the inlet 24a to a main line of the outlet 26a, analogously to the fluid supply paths 20a, 22a within the cell unit 12a.

Figure 4:
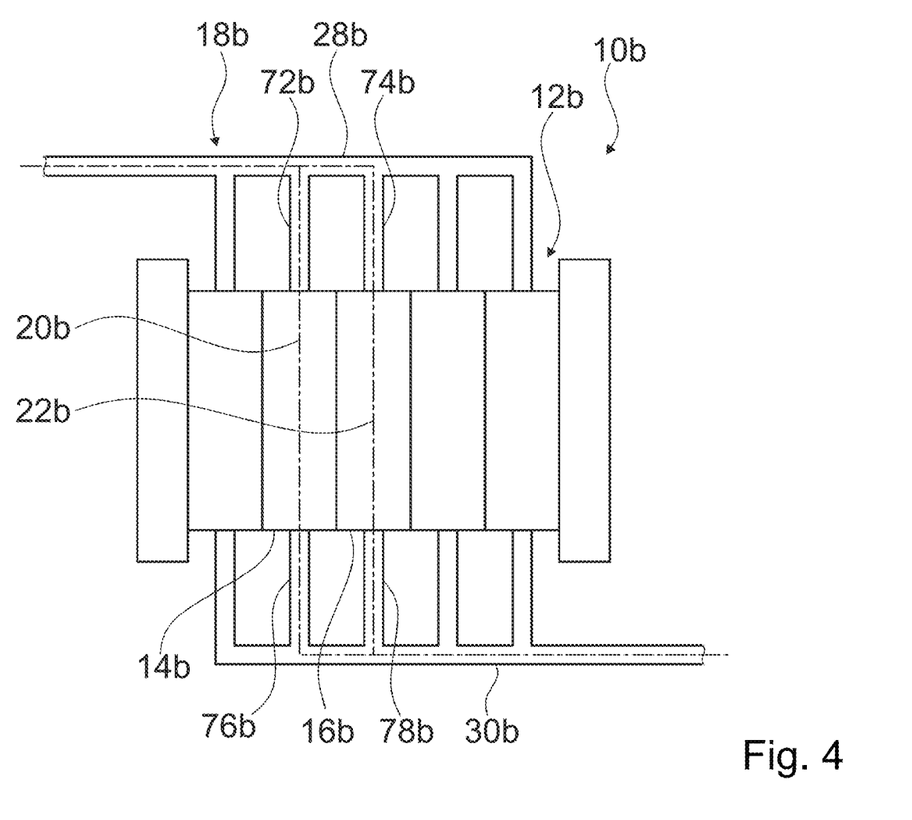
FIG. 4 shows a first alternative electrochemistry device in a schematic side view.
Figure 5:
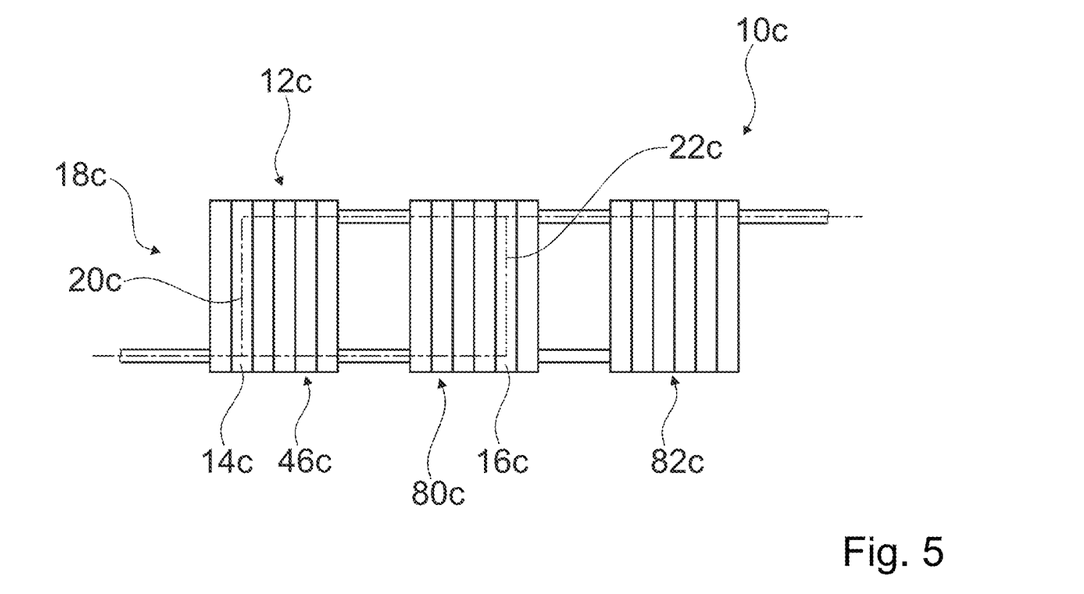
FIG. 5 shows a second alternative electrochemistry device in a schematic side view.
Figure 6:
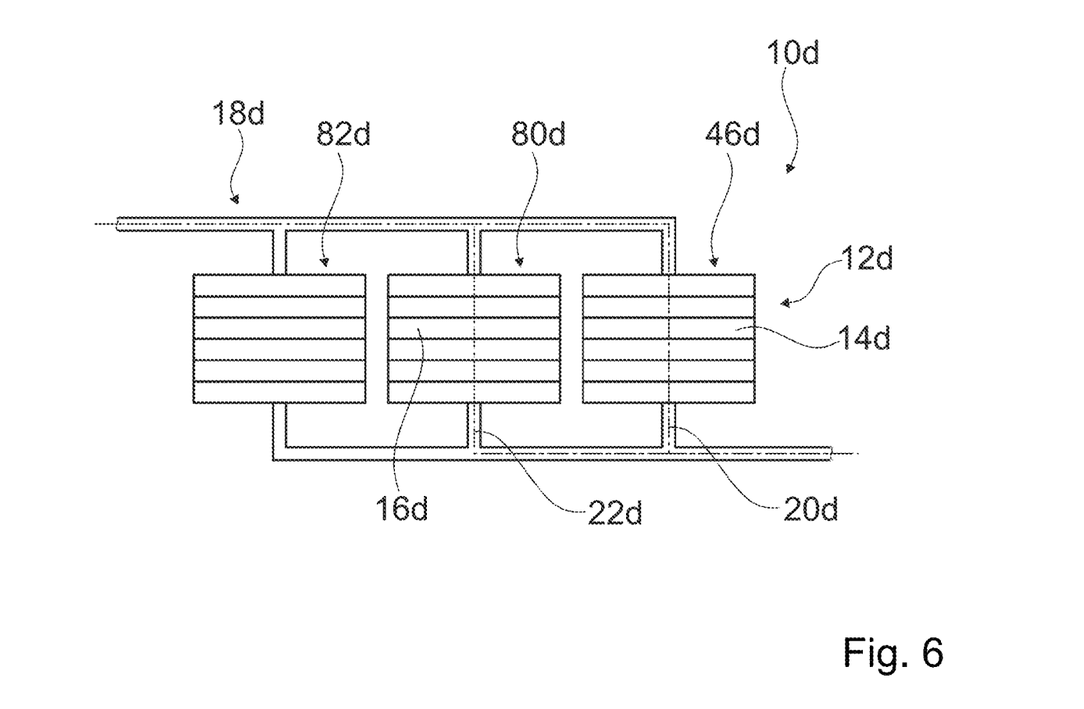
FIG. 6 shows a third alternative electrochemistry device in a schematic side view.

FIGS. 4 to 6 show three further exemplary embodiment of the invention. The following descriptions and the drawings are substantially restricted to the differences between the exemplary embodiments, wherein, with regard to identically designated components, in particular with regard to components with the same reference designations, reference may basically also be made to the drawings and/or to the description of the other exemplary embodiments, in particular of FIGS. 1 to 3. To distinguish the exemplary embodiments, the alphabetic character a has been added as a suffix to the reference designations of the exemplary embodiment in FIGS. 1 to 3. In the exemplary embodiments of FIGS. 4 to 6, the alphabetic character a has been replaced by the alphabetic characters b to d.

FIG. 4 shows a first alternative electrochemistry device 10b in a schematic side view. The first alternative electrochemistry device 10b has a cell unit 12b which comprises at least one first electrochemical cell 14b and at least one second electrochemical cell 16b. Furthermore, the first alternative electrochemistry device 10b has a fluid supply unit 18b for supplying the cell unit 12b with at least one fluid. The fluid supply unit 18b comprises at least one first fluid supply path 20b extending at least section-wise through the first electrochemical cell 14b, and at least one second fluid supply path 22b extending at least section-wise through the second electrochemical cell 16b. The fluid supply unit 18b is designed such that, in at least one normal operating state, a volume flow of the fluid through the first electrochemical cell 14b and through the second electrochemical cell 16b is at least substantially identical. In the present case, the first fluid supply path 20b and the second fluid supply path 22b are at least substantially of equal length.

The fluid supply unit 18b comprises at least one inlet channel 28b, which is arranged outside the electrochemical cells 14b, 16b and/or outside the cell unit 12b. The inlet channel 28b is a common inlet channel for the fluid supply paths 20b, 22b of the fluid supply unit 18b. Furthermore, the fluid supply unit 18b comprises at least one outlet channel 30b, which is arranged outside the electrochemical cells 14b, 16b and/or outside the cell unit 12b. The outlet channel 30b is a common outlet channel for the fluid supply paths 20b, 22b.

In the present case, the first electrochemical cell 14b and the second electrochemical cell 16b are, in particular uniquely, assigned in each case one feed portion 72b, 74b arranged outside the cell unit 12b. The feed portions 72b, 74b lead laterally into the electrochemical cells 14b, 16b. The electrochemical cells 14b, 16b are supplied with fluid individually and/or independently of one another. The feed portions 72b, 74b open into the common inlet channel 28b. Analogously, the fluid supply unit 18b comprises corresponding discharge portions 76b, 78b. In the present case, each electrochemical cell 14b, 16b of the cell unit 12b is uniquely assigned in each case at least one individual feed portion 72b, 74b and/or in each case at least one individual discharge portion 76b, 78b.

By means of the illustrated geometry of the fluid supply unit 18b, it is in particular also possible for arbitrarily arranged electrochemical cells to analogously be supplied uniformly with a fluid, in particular electrochemical cells which are not arranged in a stack and/or in a row.

FIG. 5 shows a first alternative electrochemistry device 10c in a schematic side view. The first alternative electrochemistry device 10c has a cell unit 12c which comprises at least one first electrochemical cell 14c and at least one second electrochemical cell 16c. Furthermore, the first alternative electrochemistry device 10c has a fluid supply unit 18c for supplying the cell unit 12c with at least one fluid. The fluid supply unit 18c comprises at least one first fluid supply path 20c extending at least section-wise through the first electrochemical cell 14c, and at least one second fluid supply path 22c extending at least section-wise through the second electrochemical cell 16c. The fluid supply unit 18c is designed such that, in at least one normal operating state, a volume flow of the fluid through the first electrochemical cell 14c and through the second electrochemical cell 16c is at least substantially identical. In the present case, the first fluid supply path 20c and the second fluid supply path 22c are at least substantially of equal length.

In the present case, the cell unit 12c comprises a plurality of cell stacks 46c, 80c, 82c, for example three cell stacks 46c, 80c, 82c, wherein any other desired number is conceivable. The first electrochemical cell 14c and the second electrochemical cell 16c are arranged in different cell stacks 46c, 80c of the cell unit 12c. The cell stacks 46c, 80c, 82c are connected electrically in series, wherein a parallel connection would however also be conceivable. The cell stacks 46c, 80c, 82c are hydraulically connected such that they are in each case assigned fluid supply paths of identical length. In the present case, volume flows through the individual cell stacks 46c, 80c, 82c are at least substantially identical to one another. In particular, the cell stacks 46c, 80c, 82c are hydraulically connected analogously to the electrochemical cells 14a, 16a of the exemplary embodiment of FIGS. 1 to 3.

FIG. 6 shows a first alternative electrochemistry device 10d in a schematic side view. The first alternative electrochemistry device 10d has a cell unit 12d which comprises at least one first electrochemical cell 14d and at least one second electrochemical cell 16d. Furthermore, the first alternative electrochemistry device 10d has a fluid supply unit 18d for supplying the cell unit 12d with at least one fluid. The fluid supply unit 18d comprises at least one first fluid supply path 20d extending at least section-wise through the first electrochemical cell 14d, and at least one second fluid supply path 22d extending at least section-wise through the second electrochemical cell 16d. The fluid supply unit 18d is designed such that, in at least one normal operating state, a volume flow of the fluid through the first electrochemical cell 14d and through the second electrochemical cell 16d is at least substantially identical. In the present case, the first fluid supply path 20d and the second fluid supply path 22d are at least substantially of equal length.

The cell unit 12d comprises a multiplicity of cell stacks 46d, 80d, 82d. The cell stacks 46d, 80d, 82d are hydraulically connected analogously to the electrochemical cells 14b, 16b of the exemplary embodiment of FIG. 4. The electrochemical cells 14d, 16d of the individual cell stacks 46d, 80d, 82d are hydraulically connected in each case in series with one another. It is also conceivable for each of the cell stacks 46d, 80d, 82d, as shown, to be supplied with fluid by the fluid supply unit 18d, but the individual electrochemical cells 14d, 16d of each stack are supplied with fluid in a non-uniform manner. For example, it is conceivable that, in the case of each cell stack 46d, 80d, 82d, an inlet and an outlet are arranged on the same side, and/or an inlet direction runs oppositely to an outlet direction, such that, in particular, different volume flows flow through individual electrochemical cells 14d, 16d of each cell stack 46d, 80d, 82d, but electrochemical cells 14d, 16d with analogous numbering in their cell stack 46d, 80d, 82d are in each case flowed through at least substantially identically.

The invention claimed is:

1. An electrolysis device,
   having at least one cell unit, which comprises a plurality of cell stacks, each forming an electrolysis stack, with at least one first electrolysis cell and at least one second electrolysis cell, and having at least one fluid supply unit for supplying the electrolysis cells of the cell stacks of the cell unit with liquid water as reactant of an electrolytic water splitting process and as coolant to the at least one cell unit, which at least one fluid supply unit comprises
at least one first fluid supply path extending at least section-wise through the first electrolysis cell, and
at least one second fluid supply path extending at least section-wise through the second electrolysis cell,
wherein the first fluid supply path and the second fluid supply path lead from a common inlet to the electrolysis cells and/or from the electrolysis cells to a common outlet, and
wherein the first fluid supply path and the second fluid supply path have, at least outside the first electrolysis cell and/or the second electrolysis cell, a substantially identical cross-sectional area, and
wherein the fluid supply unit is designed in such a way that the first fluid supply path and the second fluid supply path are substantially of equal length, so that in a state, in which the cell unit is operated within its specified operating parameters and/or in a fault-free manner and/or in accordance with its intended use, a volume flow of the water through the first electrolysis cell and a volume flow of the water through the second electrolysis cell is identical to an extent that each differ from 0 and deviate from one another by less than 15%, and
wherein the fluid supply unit has no regulating devices for equalizing the volume flows through the first electrolysis cell and the second electrolysis cell, and
wherein the first electrolysis cell and the second electrolysis cell are arranged in different cell stacks of the cell unit.

2. The electrolysis device as claimed in claim 1,
wherein the fluid supply unit is designed in such a way that in the state, in which the cell unit is operated within its specified operating parameters and/or in a fault-free manner and/or in accordance with its intended use, a pressure loss in the first fluid supply path deviates less than 10% from a pressure loss in the second fluid supply path.

3. The electrolysis device as claimed in claim 1,
wherein the fluid supply unit has at least one inlet channel and at least one outlet channel, which are provided for conducting the water, in the state, in which the cell unit is operated within its specified operating parameters and/or in a fault-free manner and/or in accordance with its intended use, in an inlet flow direction and in an outlet flow direction which run parallel to one another.

4. The electrolysis device as claimed in claim 3,
wherein a sum of a length of a first inlet portion and of a length of a first outlet portion of the first fluid supply path corresponds to a sum of a length of a second inlet portion and a length of a second outlet portion of the second fluid supply path, and
wherein the inlet channel at least partially forms the first inlet portion and the second inlet portion and/or the outlet channel at least partially forms the first outlet portion and the second outlet portion.

5. The electrolysis device as claimed in claim 3,
wherein a pressure loss in the first inlet portion is greater than a pressure loss in the second inlet portion, and a pressure loss in the first outlet portion is smaller than a pressure loss in the second outlet portion, and
wherein a sum of a length of a first inlet portion and of a length of a first outlet portion of the first fluid supply path corresponds to a sum of a length of a second inlet portion and a length of a second outlet portion of the second fluid supply path, and
wherein the inlet channel at least partially forms the first inlet portion and the second inlet portion and/or the outlet channel at least partially forms the first outlet portion and the second outlet portion.

6. The electrolysis device as claimed in claim 1,
wherein a sum of a length of a first inlet portion and of a length of a first outlet portion of the first fluid supply path corresponds to a sum of a length of a second inlet portion and a length of a second outlet portion of the second fluid supply path, so that a pressure loss in the first inlet portion is greater than a pressure loss in the second inlet portion, and a pressure loss in the first outlet portion is smaller than a pressure loss in the second outlet portion.

7. The electrolysis device as claimed in claim 1,
wherein the first electrolysis cell has at least one functional element which forms at least a section of the first fluid supply path and at least a section of the second fluid supply path.

8. The electrolysis device as claimed in claim 7,
wherein the functional element is a functional cell stack element.

9. An electrolyzer,
having at least one electrolysis device as claimed in claim 1.

10. A method for operating the electrolysis device as claimed in claim 1,
having the at least one cell unit, which comprises the at least one first electrolysis cell and the at least one second electrolysis cell,
wherein the first electrolysis cell and the second electrolysis cell are flowed through by water in such a way that a volume flow of the water through the first electrolysis cell and through the second electrolysis cell each differ from 0 and deviate from one another by less than 15%,
the method comprising
the electrolysis device performing electrolysis.

11. The electrolysis device of claim 1, being implemented as a polymer electrolyte membrane electrolysis device.

* * * * *